(12) United States Patent
Sakurada et al.

(10) Patent No.: US 10,828,602 B2
(45) Date of Patent: Nov. 10, 2020

(54) EXHAUST GAS PURIFYING CATALYST AND METHOD FOR PRODUCING SAME, AND EXHAUST GAS PURIFICATION DEVICE USING SAME

(71) Applicant: CATALER CORPORATION, Kakegawa (JP)

(72) Inventors: Yu Sakurada, Kakegawa (JP); Satoshi Matsueda, Kakegawa (JP); Sho Hoshino, Kakegawa (JP); Ryota Nakashima, Kakegawa (JP)

(73) Assignee: CATALER CORPORATION, Kakegawa (JP)

( * ) Notice: Subject to any disclaimer, the term of this patent is extended or adjusted under 35 U.S.C. 154(b) by 0 days.

(21) Appl. No.: 15/771,902

(22) PCT Filed: Oct. 24, 2016

(86) PCT No.: PCT/JP2016/081494
§ 371 (c)(1),
(2) Date: Apr. 27, 2018

(87) PCT Pub. No.: WO2017/073527
PCT Pub. Date: May 4, 2017

(65) Prior Publication Data
US 2018/0311616 A1   Nov. 1, 2018

(30) Foreign Application Priority Data

Oct. 27, 2015   (JP) .................................. 2015-211243

(51) Int. Cl.
*B01D 53/94*   (2006.01)
*B01J 37/04*   (2006.01)
(Continued)

(52) U.S. Cl.
CPC .............. *B01D 53/94* (2013.01); *B01J 23/10* (2013.01); *B01J 23/63* (2013.01); *B01J 35/0006* (2013.01);
(Continued)

(58) Field of Classification Search
CPC . B01D 53/94; B01J 23/10; B01J 23/63; B01J 35/0006; B01J 37/04
See application file for complete search history.

(56) References Cited

U.S. PATENT DOCUMENTS 5,254,519 A    10/1993  Wan et al.
2009/0029851 A1  1/2009  Takeshima et al.
(Continued)

FOREIGN PATENT DOCUMENTS

CN    1473651 A    2/2004
CN    102395428 A  3/2012
(Continued)

OTHER PUBLICATIONS

May 15, 2019 Extended European Search Report Issued in European Patent Application No. 16859757.3.
(Continued)

*Primary Examiner* — James A Fiorito
(74) *Attorney, Agent, or Firm* — Oliff PLC

(57) ABSTRACT

A novel exhaust gas purifying catalyst, method for producing same, and an exhaust gas purification device using same, which are capable of maintaining catalytic activity of a precious metal at a higher level than compared with conventional exhaust gas purifying catalysts. An exhaust gas purifying catalyst having a first carrier particle, a second carrier particle, and a precious metal catalyst particle carried on the first and second carrier particles, wherein: the first carrier particle contains a rare-earth oxide other than ceria and at least one metal oxide selected from the group con-
(Continued)

(a)

(b)

sisting of silica, alumina, ceria, zirconia, and titania; the second carrier particle contains a rare-earth oxide other than ceria; and the contained amount of the rare-earth oxide in the second carrier particle is higher than the contained amount of the rare-earth oxide in the first carrier particle.

11 Claims, 2 Drawing Sheets

(51) Int. Cl.
    *B01J 23/63*         (2006.01)
    *B01J 35/00*         (2006.01)
    *B01J 23/10*         (2006.01)
    B01J 23/42         (2006.01)
    B01J 23/46         (2006.01)
    B01J 23/44         (2006.01)
    B01J 21/04         (2006.01)
    B01J 21/06         (2006.01)
    B01J 21/08         (2006.01)

(52) U.S. Cl.
    CPC ......... *B01J 37/04* (2013.01); *B01D 2255/206* (2013.01); *B01D 2255/20715* (2013.01); *B01J 21/04* (2013.01); *B01J 21/063* (2013.01); *B01J 21/066* (2013.01); *B01J 21/08* (2013.01); *B01J 23/42* (2013.01); *B01J 23/44* (2013.01); *B01J 23/464* (2013.01)

(56) References Cited

U.S. PATENT DOCUMENTS

| | | | |
|---|---|---|---|
| 2010/0056368 | A1 | 3/2010 | Takeshima et al. |
| 2012/0094827 | A1 | 4/2012 | Matsueda et al. |
| 2015/0217284 | A1* | 8/2015 | Wille ................. B01J 23/40 |
| | | | 423/212 |

FOREIGN PATENT DOCUMENTS

| | | |
|---|---|---|
| CN | 102824904 A | 12/2012 |
| CN | 103240083 A | 8/2013 |
| EP | 2 177 265 A1 | 4/2010 |
| EP | 2 431 092 A1 | 3/2012 |
| JP | 2002-518171 A | 6/2002 |
| JP | 2004-275919 A | 10/2004 |
| JP | 2005-058972 A | 3/2005 |
| JP | 2006-298682 A | 11/2006 |
| JP | 2008-018323 A | 1/2008 |
| JP | 2008-104928 A | 5/2008 |
| JP | 2011-183317 A | 9/2011 |
| JP | 2013-117190 A | 6/2013 |
| JP | 2014-509241 A | 4/2014 |
| JP | 2015-85241 A | 5/2015 |
| WO | 99/67020 A1 | 12/1999 |
| WO | 2012/069404 A1 | 5/2012 |

OTHER PUBLICATIONS

Dec. 6, 2016 International Search Report issued in International Patent Application No. PCT/JP2016/081494.
May 13, 2020 Office Action issued in Chinese Patent Application No. 201680061878.3.

* cited by examiner

EXHAUST GAS PURIFYING CATALYST AND METHOD FOR PRODUCING SAME, AND EXHAUST GAS PURIFICATION DEVICE USING SAME

FIELD

The present invention relates to a novel exhaust gas purifying catalyst, a method for producing the same, and an exhaust gas purification device using the same.

BACKGROUND

Exhaust gas from an internal combustion engine, such as an automobile engine, contains nitrogen oxides ($NO_x$), carbon monoxide (CO) and hydrocarbons (HC). Thus, this exhaust gas is released into the atmosphere after having been purified by an exhaust gas purifying catalyst that oxidizes CO and HC and reduces $NO_x$. A typical known example of an exhaust gas purifying catalyst is a three-way catalyst in which a precious metal such as platinum (Pt), rhodium (Rh) or palladium (Pd) is supported on a porous metal oxide carrier such as γ-alumina.

Although this metal oxide carrier can be made with various materials, alumina ($Al_2O_3$) has typically been used in the past in order to obtain high surface area. More recently, however, various other materials such as ceria ($CeO_2$), zirconia ($ZrO_2$) or titania ($TiO_2$) have been proposed for use either alone or in combination with alumina in order to promote purification of exhaust gas using chemical properties of the carrier. In addition, ceria-zirconia solid solutions have also been proposed for use as such a carrier.

The heat resistance of ceria-zirconia solid solutions is known to be able to be improved by adding an element selected from the group consisting of alkaline metals, alkaline earth metals and rare earth elements to the ceria-zirconia solid solution (see, for example, Patent Document 1). In addition, Patent Document 2 discloses the obtaining of favorable exhaust gas purification performance by supporting rhodium on zirconia carrier particles to which a rare earth element has been added.

Patent Document 3 and Patent Document 4 disclose carrier particles obtained by imparting a rare earth element-enriched area to ceria-zirconia solid solution particles. In the inventions described in Patent Document 3 and Patent Document 4, attention is focused on the affinity between a rare earth oxide and rhodium, and the migration and sintering of rhodium on the particle surfaces are inhibited in the rare earth element-enriched area while preventing oxidation of rhodium, thereby maintaining the catalytic activity of the rhodium at a high level.

Sintering of catalyst precious metals can be prevented by combining a metal oxide carrier with a rare earth element in this manner.

CITATION LIST

Patent Literature

[Patent Document 1] JP2004-275919A
[Patent Document 2] JP2002-518171T
[Patent Document 3] JP2008-018323A
[Patent Document 4] JP2008-104928A

SUMMARY

Technical Problem

An object of the present invention is to provide a novel exhaust gas purifying catalyst, which is capable of maintaining the catalytic activity of a precious metal at a higher level than that of conventional exhaust gas purifying catalysts, a method for producing the same, and an exhaust gas purification device that uses the same.

Solution to Problem

Examples of embodiments of the present invention include the aspects indicated below.

<Aspect 1>

An exhaust gas purifying catalyst having a first carrier particle, a second carrier particle, and a precious metal catalyst particle supported on the first carrier particle and the second carrier particle; wherein, the first carrier particle contains at least one metal oxide selected from the group consisting of silica, alumina, ceria, zirconia and titania, and a rare earth oxide other than ceria, the second carrier particle contains a rare earth oxide other than ceria and optionally contains at least one metal oxide selected from the group consisting of silica, alumina, ceria, zirconia and titania, the content of the metal oxide of the first carrier particle is higher than the content of the metal oxide of the second carrier particle, and the content of the rare earth oxide of the second carrier particle is higher than the content of the rare earth oxide of the first carrier particle.

<Aspect 2>

The exhaust gas purifying catalyst described in Aspect 1, wherein the content of the rare earth oxide of the first carrier particle is less than 20% by weight, and the content of the rare earth oxide of the second carrier particle is 20% by weight or more.

<Aspect 3>

The exhaust gas purifying catalyst described in Aspect 2, wherein, in the case of observing the first carrier particle and the second carrier particle with a scanning transmission electron microscope, the ratio of the projected area of the second carrier particle to the projected area of the first carrier particle (area of second carrier particle/area of first carrier particle) is within the range of 0.050 to 0.100.

<Aspect 4>

The exhaust gas purifying catalyst described in any of Aspects 1 to 3, wherein the metal oxide of the first carrier particle and the metal oxide of the second carrier particle if present are ceria-zirconia solid solutions, and the rare earth oxide of the first carrier particle and the rare earth oxide of the second carrier particle are oxides of at least one rare earth element selected from the group consisting of yttrium, lanthanum, praseodymium, neodymium and samarium.

<Aspect 5>

The exhaust gas purifying catalyst described in Aspect 4, wherein the first carrier particle contains 50% by weight to 95% by weight of zirconia, 5.0% by weight to 45% by weight of ceria and 1.0% by weight to less than 20% by weight of a rare earth oxide other than ceria, and the second carrier particle contains 0.0% by weight to 40% by weight of zirconia, 0.0% by weight to 40% by weight of ceria, and 20% by weight to 60% by weight of a rare earth oxide other than ceria.

<Aspect 6>

The exhaust gas purifying catalyst described in any of Aspects 2 to 5, wherein the mean particle diameters of the first carrier particle and the second carrier particle as measured with a scanning transmission electron microscope are 0.50 μm to 100 μm and 0.50 μm to 5 μm, respectively.

<Aspect 7>

The exhaust gas purifying catalyst described in any of Aspects 1 to 6, wherein the precious metal catalyst particle contains platinum particles, palladium particles, rhodium particles or a combination thereof.

<Aspect 8>

The exhaust gas purifying catalyst described in any of Aspects 2 to 7, wherein, when measurement of the intensity of characteristic X-rays, obtained by energy dispersive X-ray analysis using a scanning electron microscope, is carried out, the correlation coefficient calculated according to the formula below is 65.0% or more:

$$\frac{\sum_{i=1}^{n}(x_i - x_{av})(y_i - y_{av})}{\sqrt{\sum_{i=1}^{n}(x_i - x_{av})^2} \sqrt{\sum_{i=1}^{n}(y_i - y_{av})^2}} \times 100(\%)$$ [Math. 1]

wherein, the spectral intensity value of a precious metal element contained in a precious metal catalyst particle i is defined as $x_i$, the average spectral intensity of the precious metal element is defined as $x_{av}$, the spectral intensity value of the rare earth element other than cerium at the location of the precious metal catalyst particle i is defined as $y_i$, and the average spectral intensity of the rare earth element other than cerium is defined as $y_{av}$.

<Aspect 9>

An exhaust gas purification device containing the exhaust gas purifying catalyst described in any of Aspects 1 to 8 and a substrate.

<Aspect 10>

A method for producing an exhaust gas purifying catalyst, comprising the followings:

mixing an aqueous dispersion of a carrier particle, containing at least one metal oxide selected from the group consisting of silica, alumina, ceria, zirconia and titania and a rare earth oxide other than cerium; an aqueous solution containing a salt of a catalyst precious metal; and an organic carboxylic acid, and supporting the catalyst precious metal on the carrier particle to obtain an aqueous dispersion containing an unfired exhaust gas purifying catalyst and, drying and firing the aqueous dispersion containing the unfired exhaust gas purifying catalyst.

<Aspect 11>

The method described in Aspect 10, wherein the metal oxide of the carrier particle is a ceria-zirconia solid solution, the rare earth oxide of the carrier particle is an oxide of at least one rare earth element selected from the group consisting of yttrium, lanthanum, praseodymium, neodymium and samarium, and the salt of the catalyst precious metal is a nitrate or sulfate of platinum, palladium, rhodium or a combination thereof.

<Aspect 12>

The method described in Aspect 10 or 11, wherein the organic carboxylic acid is an organic carboxylic acid having a molecular weight of 300 or less.

<Aspect 13>

The method described in any of Aspects 10 to 12, wherein the molar ratio of the number of moles of the organic carboxylic acid to the total number of moles of rare earth element contained in the carrier particle (mol/mol-Ln) is 0.5 to 3.5.

Advantageous Effects of Invention

According to the present invention, a novel exhaust gas purifying catalyst, which is capable of maintaining the catalytic activity of a precious metal at a higher level than that of conventional exhaust gas purifying catalysts, a method for producing the same, and an exhaust gas purification device that uses the same, can be provided.

BRIEF DESCRIPTION OF DRAWINGS

FIG. 1(a) is a conceptual diagram of an exhaust gas purifying catalyst of the prior art, while FIG. 1(b) is a conceptual diagram of the exhaust gas purifying catalyst of the present invention.

DESCRIPTION OF EMBODIMENTS

<<Exhaust Gas Purifying Catalyst>>

The exhaust gas purifying catalyst of the present invention has a first carrier particle, a second carrier particle and a precious metal catalyst particle supported on the first and second carrier particles. The first carrier particle contains at least one metal oxide selected from the group consisting of silica, alumina, ceria, zirconia and titania and a rare earth oxide other than ceria, while the second carrier particle contains a rare earth oxide other than ceria and optionally contains at least one metal oxide selected from the group consisting of silica, alumina, ceria, zirconia and titania. The metal oxide content of the first carrier particle is higher than the metal oxide content of the second carrier particle, and the rare earth oxide content of the second particle is higher than the rare earth oxide content of the first carrier particle.

In the prior art, catalytic activity is maintained at a high level by imparting a rare earth element-enriched area to the surface of a metal oxide carrier, and inhibiting migration and sintering of precious metal catalyst particles in the rare earth element-enriched area while preventing oxidation of the precious metal catalyst particles. In contrast, in the present invention, an even higher level of activity was able to be imparted to precious metal catalyst particles by combining the use of a second support having a high rare earth oxide content with an ordinary metal oxide carrier. Without being bound by theory, in the present invention, catalytic activity is thought to have been able to be made even higher as a result of precious metal catalyst particles being intensively supported on a second carrier having a high rare earth oxide content.

Figure 1:
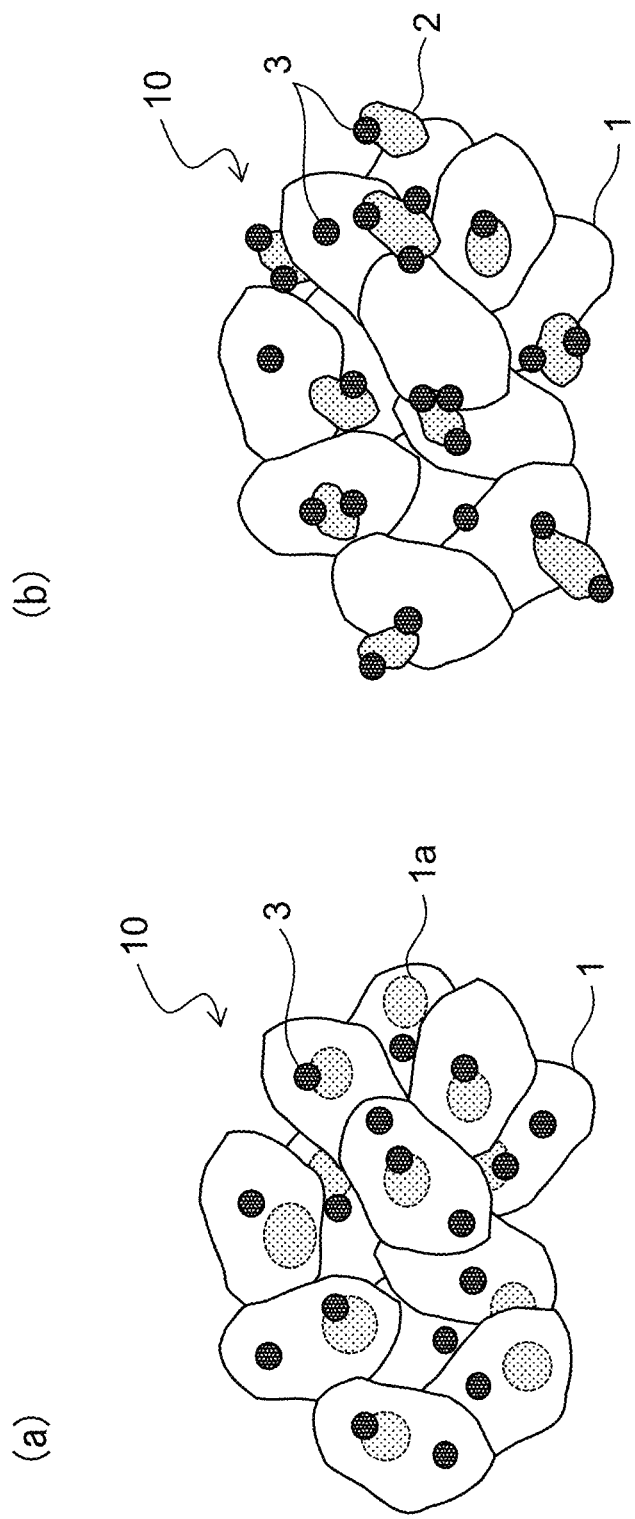

FIG. 1(a) is a conceptual diagram of an exhaust gas purifying catalyst of the prior art, while FIG. 1(b) is a conceptual diagram of the exhaust gas purifying catalyst of the present invention. In FIG. 1(a), an exhaust gas purification catalyst (10) has metal oxide carrier particles (1) and precious metal catalyst particles (3), and rare earth element-enriched areas (1a) are present in the metal oxide particles (1). In FIG. 1(b), the exhaust gas purification catalyst (10) has first metal oxide carrier particles (1), second carrier particles (2) having a high rare earth oxide content, and precious metal catalyst particles (3), and many of the precious metal catalyst particles (3) are supported on the second carrier particles (2).

(Carrier Particles)

At least one first carrier particle and second carrier particle are used to support the precious metal catalyst particles in the exhaust gas purifying catalyst of the present invention. A third carrier particle other than the first carrier particle and the second carrier particle can also be used.

For example, in the case of defining the first carrier particle as a particle in which the content of rare earth oxide other than ceria is less than 20% by weight, defining the second carrier particle as a particle in which the content of rare earth oxide other than ceria is 20% by weight or more, and observing the first carrier particle and the second carrier particle with a scanning transmission electron microscope, the ratio of the projected area of the second carrier particle to the projected area of the first carrier particle contained in the exhaust gas purifying catalyst of the present invention (area of second carrier particle/area of first carrier particle) may be 0.005 or more, 0.01 or more, 0.03 or more, 0.05 or more or 0.06 or more, and 0.30 or less, 0.25 or less, 0.20 or less, 0.15 or less, 0.10 or less or 0.08 or less. If the aforementioned ratio is within this range, the precious metal catalyst particle can be intensively supported on the second carrier particle, sintering of the precious metal catalyst particle can be substantially prevented, and increases in $NO_X$ purification temperature tend to be prevented. Furthermore, the aforementioned projected area ratio can be made to be within the same range even in the case the aforementioned definitions of the first carrier particle and second carrier particle have been changed.

The carrier particles may be a portion of a substrate as described in Japanese Unexamined Patent Publication No. 2015-85241.

(Carrier Particles—First Carrier Particle)

The first carrier particle used in the exhaust gas purifying catalyst of the present invention contains at least one metal oxide selected from the group consisting of silica, alumina, ceria, zirconia and titania and a rare earth oxide other than ceria. The first carrier particle preferably at least contains ceria and/or zirconia.

For example, in the case of defining the first carrier particle as a particle in which the content of rare earth oxide other than ceria is less than 20% by weight, and defining the second carrier particle as a particle in which the content of rare earth oxide other than ceria is 20% by weight or more, the mean particle diameter of the first carrier particle may be 0.50 μm or more, 1.0 μm or more, 3.0 μm or more, 5.0 μm or more, 8.0 μm or more or 10.0 μm or more, and 100 μm or less, 80 μm or less, 50 μm or less, 30 μm or less or 20 μm or less. The mean particle diameter of the first carrier particle can be made to be within the same range even in the case the aforementioned definitions of the first carrier particle and second carrier particle have been changed.

Measurement of mean particle diameter is carried out with the Tecnai Osiras scanning transmission electron microscope manufactured by FEI Company Japan Ltd. and an energy dispersive X-ray analyzer provided with that device. Namely, the first carrier particles can be located by energy dispersive X-ray analysis from among particles having an equivalent diameter of 0.10 μm or more on a screen projected at a measurement magnification factor of 20,000× by this device. The equivalent diameter of these particles is then calculated from the projected area of the particles. This process is then carried out on 20 arbitrary screens, and the mean value of all particles is recognized as the mean particle diameter of the first carrier particles. Here, the equivalent diameter of a particle refers to the diameter of a perfect circle having an outer circumferential length equal to the outer circumferential length of the particle.

The first carrier particle contains at least one metal oxide selected from the group consisting of silica, alumina, ceria, zirconia and titania, and the content thereof based on the weight of the first carrier particle may be 50% by weight or more, 55% by weight or more, 60% by weight or more, 65% by weight or more or 70% by weight or more, and 95% by weight or less, 90% by weight or less, 85% by weight or less or 80% by weight or less.

In the case the first carrier particle contains ceria as metal oxide, the total content of ceria and rare earth oxide other than ceria of the first carrier particle based on the weight of the first carrier particle may be 5.0% by weight or more, 10% by weight or more, 15% by weight or more, 20% by weight or more or 25% by weight or more, and 50% by weight or less, 45% by weight or less, 40% by weight or less or 35% by weight or less.

In the case the first carrier particle contains ceria as metal oxide, the ceria content may be 5.0% by weight or more, 10% by weight or more, 15% by weight or more or 20% by weight or more, and 45% by weight or less, 40% by weight or less, 35% by weight or less or 30% by weight or less. Moreover, the content of rare earth oxide other than ceria may be 1.0% by weight or more, 3.0% by weight or more, 5.0% by weight or more or 7.0% by weight or more, and 30% by weight or less, 25% by weight or less, 20% by weight or less, 15% by weight or less or 10% by weight or less.

The first carrier particle is preferably in the form of a solid solution of the aforementioned metal oxides, and for example, preferably contains a ceria-zirconia solid solution as the aforementioned metal oxide. In this case, the zirconia content of the first carrier particle may be 40% by weight or more, 45% by weight or more, 50% by weight or more, 55% by weight or more, 60% by weight or more, 65% by weight or more or 70% by weight or more, and 95% by weight or less, 90% by weight or less, 85% by weight or less or 80% by weight or less. In addition, in this case, the ceria content of the first carrier particle may be 5.0% by weight or more, 10% by weight or more, 15% by weight or more, 20% by weight or more or 25% by weight or more, and 50% by weight or less, 45% by weight or less, 40% by weight or less or 35% by weight or less. Here, these contents can be determined by calculating from the results of elemental analysis.

Examples of the rare earth oxide of the first carrier particle include rare earth elements having a low atomic number that form ions having one or a large number of vacant 4f electron orbitals, such as oxides of rare earth elements selected from the group consisting of yttrium (Y), lanthanum (La), praseodymium (Pr), neodymium (Nd) and samarium (Sm).

The first carrier particle optionally contains a component other than those described above, and for example, optionally contains barium oxide.

The first carrier particle can be produced by a known method described in the aforementioned patent literature.

(Carrier Particles—Second Carrier Particle)

The second carrier particle used in the exhaust gas purifying catalyst of the present invention contains a rare earth oxide other than ceria and optionally contains at least one metal oxide selected from the group consisting of silica, alumina, ceria, zirconia and titania. Here, the metal oxide content of the second carrier particle is lower than the metal oxide content of the first carrier particle, and the rare earth oxide content of the second carrier particle is higher than the rare earth oxide content of the first carrier particle. As a result, precious metal catalyst particles can be intensively supported on the second carrier particle.

For example, in the case of defining the first carrier particle as a particle in which the content of rare earth oxide other than ceria is less than 20% by weight, and defining the second carrier particle as a particle in which the content of rare earth oxide other than ceria is 20% by weight or more, the mean particle diameter of the second carrier particle may be 0.50 μm or more, 1.0 μm or more, 2.0 μm or more or 3.0 μm or more, and 50 μm or less, 20 μm or less, 15 μm or less, 10 μm or less or 5.0 μm or less. If mean particle diameter is within this range, precious metal catalyst particles can be intensively supported on the second carrier particle, sintering of the precious metal catalyst particles can be substantially prevented, and increases in $NO_X$ purification temperature tend to be prevented. The mean particle diameter of the second carrier particle can be made to be within the same range even in the case the aforementioned definitions of the first carrier particle and second carrier particle have been changed. This mean particle diameter is measured according to the same method as that used to measure mean particle diameter of the first carrier particle as previously described.

The second carrier particle contains a rare earth oxide other than ceria, and the content thereof may be 10% by weight or more, 15% by weight or more, 20% by weight or more, 25% by weight or more or 30% by weight or more, and 60% by weight or less, 55% by weight or less, 50% by weight or less, 45% by weight or less or 40% by weight or less.

The second carrier particle may or may not contain at least one metal oxide selected from the group consisting of silica, alumina, ceria, zirconia and titania. In the case of containing a metal oxide, the content thereof based on the weight of the second carrier particle may be 1.0% by weight or more, 2.0% by weight or more, 3.0% by weight or more, 5.0% by weight or more, 10% by weight or more or 15% by weight or more, and 40% by weight or less, 35% by weight or less, 30% by weight or less or 25% by weight or less.

In the case the second carrier particle contains ceria and a rare earth oxide other than ceria, the content thereof based on the weight of the second carrier particle may be 60% by weight or more, 65% by weight or more, 70% by weight or more, 75% by weight or more or 80% by weight or more, and 99% by weight or less, 95% by weight or less, 93% by weight or less or 90% by weight or less.

In the case the second carrier particle contains ceria, the content thereof may be 20% by weight or more, 25% by weight or more or 30% by weight or more, and 60% by weight or less, 55% by weight or less, 50% by weight or less, 45% by weight or less or 40% by weight or less.

The same type of rare earth oxide as the rare earth oxide contained in the first carrier particle can be used for the rare earth oxide of the second carrier particle.

The second carrier particle optionally contains a third component other than zirconia and rare earth oxide in the same manner as the first carrier particle, and for example, alumina, silica or titania may be contained.

The second carrier particle can be produced by a known method described in the aforementioned patent literature. However, the second carrier particle is preferably obtained by adding carrier particles to an organic carboxylic acid solution and then eluting from the carrier particles as will be subsequently described in detail.

(Precious Metal Catalyst Particle)

Examples of the precious metal catalyst particle used in the exhaust gas purifying catalyst of the present invention particularly include platinum group metals, and preferably include platinum particles, palladium particles, rhodium particles and combinations thereof.

The precious metal catalyst particle preferably has a sufficiently small particle diameter from the viewpoint of enhancing contact area with exhaust gas. The mean particle diameter of the catalyst particle as the mean value of the equivalent diameter determined by TEM observation may typically be about 1 nm to 20 nm, 10 nm or less, 7 nm or less or 5 nm or less.

The precious metal catalyst particle may be supported at a total of 0.1 parts by weight or more, 0.3 parts by weight or more, 0.5 parts by weight or more or 1.0 parts by weight or more, and 10 parts by weight or less, 5 parts by weight or less, 3.0 parts by weight or less or 2.0 parts by weight or less based on a total of 100 parts by weight of the first carrier particle and second carrier particle.

With respect to the precious metal catalyst particle being intensively supported on the second carrier having a high content of rare earth oxide, in the present invention, in the case of measuring characteristic X-ray intensity obtained by energy dispersive X-ray analysis using a scanning electron microscope, the locations thereof preferably coincide at a correlation coefficient of 65.0% or more, 70.0% or more, 75.0% or more or 80% or more. Here, correlation coefficient is calculated in the manner indicated below:

$$\frac{\sum_{i=1}^{n}(x_i - x_{av})(y_i - y_{av})}{\sqrt{\sum_{i=1}^{n}(x_i - x_{av})^2}\sqrt{\sum_{i=1}^{n}(y_i - y_{av})^2}} \times 100(\%) \quad \text{[Math. 2]}$$

wherein, the spectral intensity value of the precious metal element contained in a precious metal catalyst particle i is defined as $x_i$, the average spectral intensity of the precious metal element is defined as $x_{av}$, the spectral intensity value of the rare earth element other than cerium at the location of the precious metal catalyst particle i is defined as $y_i$, and the average spectral intensity of the rare earth element other than cerium is defined as $y_{av}$.

This measurement can be carried out using the Tecnai Osiras scanning transmission electron microscope manufactured by FEI Company Japan Ltd. More specifically, center of gravity analysis is carried out on the precious metal catalyst particle i in a plurality of images at a magnification factor of 5000× measured with this scanning electron microscope, followed by measuring the spectral intensity value of the precious metal element of the precious metal catalyst particle i at the location of the center of gravity and the spectral intensity value of the rare earth element other than cerium at the location of the center of gravity, and calculating in the manner described above. Here, in the case there are a plurality of types of precious metal elements and rare earth elements other than cerium, the intensities thereof are added. Furthermore, "average spectral intensity" refers to the average value of all characteristic X-ray intensities of the precious metal element contained in the precious metal catalyst particles or rare earth element other than cerium contained in the second carrier able to be viewed in the same or different fields. In the case of carrying out the aforementioned calculation, preferably at least 300 particles each of the second carrier and precious metal catalyst particles are used.

<Exhaust Gas Purification Device>

The exhaust gas purification device of the present invention contains the previously described exhaust gas purifying catalyst and a substrate. The exhaust gas purifying catalyst may be an exhaust gas purifying catalyst obtained according to the method for producing an exhaust gas purifying catalyst of the present invention described below.

Examples of the substrate include straight flow-type or wall flow-type honeycomb substrates commonly used in exhaust gas purification devices. There are no particular limitations on the material of the substrate, and examples thereof include ceramics, silicon carbide and metal. In the case of using such a substrate, a catalyst layer having the aforementioned exhaust gas purifying catalyst can be formed on the substrate.

In the exhaust gas purification device of the present invention, the substrate may be a portion of the substrate described in Japanese Unexamined Patent Publication No. 2015-85241, and in this case, the first and second carrier particles may also be a portion of this substrate. When using the aforementioned substrate, precious metal may be supported by immersing the substrate in a solution obtained by dissolving the precious metal. A catalyst layer having the aforementioned exhaust gas purifying catalyst may be formed on this substrate.

<<Method for Producing Exhaust Gas Purifying Catalyst>>

The method of the present invention for producing an exhaust gas purifying catalyst comprises a step of mixing an aqueous dispersion of a carrier particle, containing at least one metal oxide selected from the group consisting of silica, alumina, ceria, zirconia and titania and a rare earth oxide other than cerium; an aqueous solution containing a salt of a precious metal; and an organic carboxylic acid, and supporting the precious metal on the carrier particle to obtain an aqueous dispersion containing an unfired exhaust gas purifying catalyst and, a step of drying and firing the aqueous dispersion containing the unfired exhaust gas purifying catalyst.

According to this method, rare earth oxide is eluted from the carrier particle by an organic carboxylic acid to obtain a second carrier particle enriched with the rare earth oxide and a first carrier particle enriched with metal oxide. In this case, the precious metal is mainly supported on the second carrier particle enriched with the rare earth oxide, and since sintering and oxidation of the precious metal serving as catalyst can be prevented as a result thereof, a preferable exhaust gas purifying catalyst can be obtained that is capable of maintaining catalytic activity of the precious metal at a high level. In the case the starting substance in the form of the carrier particle contains a solid solution of a metal oxide, the rare earth oxide not in solid solution is more easily eluted by the organic carboxylic acid, thereby making this aspect particularly preferable.

Moreover, it was surprisingly found that precious metal catalyst particles of an exhaust gas purification catalyst obtained according to this method have a smaller diameter in comparison with that in the case of conventional methods in which an organic carboxylic acid is not added. Without being bound by theory, this is thought to be due to the formation of a rare earth organic carboxylate following the addition of organic carboxylic acid, the precious metal selectively adsorbing to the rare earth organic carboxylate, and precious metal being immobilized due to interaction between the rare earth element and precious metal after firing. As the particle diameter of the precious metal catalyst particle becomes smaller, the surface area of the precious metal catalyst particle per unit weight becomes larger and the number of catalyst reactive sites increases, thereby making this extremely advantageous.

The exhaust gas purifying catalyst of the present invention in particular can be produced according to the method of the present invention for producing an exhaust gas purifying catalyst. Thus, the particle diameter of the carrier particles, the added amounts of zirconia, ceria and rare earth oxide other than ceria in the carrier particles, the type and added amount of rare earth oxide other than ceria, and the type and added amount of precious metal used in the method of the present invention can be selected with reference to the previously described description of the exhaust gas purifying catalyst of the present invention.

For example, in the step for obtaining an aqueous dispersion containing an unfired exhaust gas purifying catalyst, the amount (reaction equivalence point) of organic carboxylic acid that is neither in excess or deficient relative to the amount of rare earth component other than cerium contained in the carrier particles is dissolved in an aqueous solution. A salt of a precious metal is then mixed into the aqueous solution of the organic carboxylic acid followed by mixing the aqueous solution containing the organic carboxylic acid and precious metal with a dispersion having the carrier particles dispersed therein.

The amount of organic carboxylic acid used in the method of the present invention can be expressed as the molar ratio (mol/mol-Ln) of the number of moles of organic carboxylic acid added (mol) to the total number of moles of rare earth element contained in the carrier particles (mol-Ln). The molar ratio (mol/mol-Ln) may preferably be 0.5 or more, 1.0 or more or 1.5 or more, and 3.5 or less, 3.0 or less or 2.5 or less. If the molar ratio is within this range, the metal oxide of the carrier particles is difficult to dissolve while the rare earth oxide dissolves easily, thereby facilitating formation of the second carrier particle.

The carrier particle may have the same composition as the first carrier particle used in the aforementioned exhaust gas purifying catalyst of the present invention.

Examples of the salt of a precious metal include strong acid salts of the precious metal, and examples thereof particularly include nitrates and sulfates of precious metals. Examples of precious metals include platinum, palladium and rhodium.

Examples of the organic carboxylic acid preferably include organic carboxylic acids having a molecular weight of 300 or less, examples of which include saturated fatty acids, unsaturated fatty acids, hydroxy acids, aromatic carboxylic acids, dicarboxylic acids, tricarboxylic acids and oxycarboxylic acids having 1 to 20 carbon atoms. Specific examples thereof include formic acid, acetic acid, propionic acid, butyric acid, tartaric acid, oxalic acid, malonic acid and succinic acid.

The added amount of organic carboxylic acid may be 0.50 times or more, 1.0 times or more or 2.0 times or more, and 5.0 times or less, 4.5 times or less, 4.0 times or less or 3.5 times or less the molar amount of the rare earth component, and preferably the rare earth component not in solid solution, contained in the carrier particles.

After obtaining the exhaust gas purifying catalyst of the present invention, the aqueous dispersion containing the same is dried and fired. The drying temperature may be, for example, 150° C. or higher, 200° C. or higher or 250° C. or higher, and 400° C. or lower, 350° C. or lower or 300° C. or lower. The drying time may be 16 hours or more, 12 hours or more or 8 hours or more, and 24 hours or less or 20 hours or less. In addition, the firing temperature may be 500° C. or higher, 550° C. or higher or 600° C. or higher, and 1000° C. or lower, 800° C. or lower or 700° C. or lower. The firing time may be 30 minutes or more, 1 hour or more, 2 hours or more or 4 hours or more, and 12 hours or less, 10 hours or less or 8 hours or less.

The exhaust gas purifying catalyst obtained in this manner can be further crushed to make the particle diameter of the carrier particles to be within the range of the particle diameter of the first carrier particle of the exhaust gas purifying catalyst of the present invention.

EXAMPLES

<<Sample Preparation>>

Example 1

Acetic acid in a molar amount that reacts neither in excess or deficiently relative to the sum of the rare earth element other than cerium contained in the carrier particles was dissolved in ion exchange water to prepare an aqueous acetic acid solution. Next, rhodium nitrate solution was added to the acetic acid solution so that the amount of rhodium was 0.50% by weight of the carrier particles to obtain an aqueous solution containing acetic acid and rhodium acetate. This solution was mixed with a dispersion obtained by dispersing carrier particles in ion exchange water. This mixture was then stirred, dried for 8 hours at 250° C., fired for 1 hour at 500° C. and then crushed to obtain the exhaust gas purifying catalyst of Example 1.

Examples 2 to 4 and Comparative Examples 1 to 3

Exhaust gas purifying catalysts of Examples 2 to 4 were obtained in the same manner as Example 1 with the exception of using other organic carboxylic acids instead of acetic acid. In addition, exhaust purifying catalysts of Comparative Examples 1 and 2 were obtained in the same manner as Example 1 with the exception of using other acids instead of an organic carboxylic acid. Moreover, the exhaust gas purifying catalyst of Comparative Example 3 was obtained in the same manner as Example 1 with the exception of not using acetic acid. Details of the compositions of these examples are shown in Table 1.

Examples 5 and 6 and Comparative Examples 4 and 5

Exhaust gas purifying catalyst of Examples 5 and 6 were obtained by changing the carrier particles and precious metal salt used in Example 2. In addition, exhaust gas purifying catalysts of Comparative Examples 4 and 5 were obtained in the same manner as Examples 5 and 6, respectively, with the exception of not using an organic carboxylic acid. The details of the compositions of these examples are shown in Table 2.

Examples 7 to 15

Exhaust gas purifying catalysts of Examples 7 to 15 were obtained by changing the composition of the carrier particles of Example 4 and changing the added amount of carboxylic acid. Details of the compositions of these examples are shown in Table 3.

Examples 16 to 19 and Comparative Examples 6 to 9

Exhaust gas purifying catalysts of Examples 16 to 19 and Comparative Examples 6 to 9 were obtained by changing the types of carrier particles used in Example 1. Details of the compositions of these examples are shown in Table 4.

<Exhaust Gas Purifying Catalysts after Durability Testing>

The exhaust gas purifying catalysts obtained in the manner described above were arranged in a flow through-type durability tester. After raising the internal temperature of the tester to 1000° C., a lean gas, obtained by adding oxygen to nitrogen gas at a concentration of 1%, and a rich gas, obtained by adding carbon monoxide to nitrogen gas at a concentration of 2%, were allowed to alternately flow through the tester in two minute cycles at a flow rate of 500 mL/min. The exhaust gas purifying catalysts were subsequently evaluated as exhaust gas purifying catalysts after durability testing.

<Fabrication of Exhaust Gas Purification Devices>

The exhaust gas purifying catalysts obtained in the manner described above were mixed with alumina powder at a weight ratio of 1:1 followed by dispersing in pure water at a solid content of 30% by weight to obtain slurries. The slurries were then coated onto a monolith honeycomb substrate (volume: 0.35 L) so that the amount of heavy metal was coated at 0.25 g/L. The coated monolith honeycomb substrates were dried for 10 minutes at 250° C. and then fired for 20 minutes at 500° C. to obtain exhaust gas purification devices.

<Exhaust Gas Purification Devices after Durability Testing>

The exhaust gas purification devices obtained in the manner described above were arranged in a flow through-type durability tester. After raising the internal temperature of the tester to 1000° C., a lean gas, obtained by adding oxygen to nitrogen gas at a concentration of 1%, and a rich gas, obtained by adding carbon monoxide to nitrogen gas at a concentration of 2%, were allowed to alternately flow through the tester in two minute cycles at a flow rate of 500 mL/min. The exhaust gas purification devices were subsequently evaluated as exhaust gas purification devices after durability testing.

<<Evaluation Methods>>

<Mean Particle Diameter and Abundance Ratio of Second Carrier>

Mean particle diameter of carrier particles of the exhaust gas purifying catalysts were measured with the Tecnai Osiras scanning transmission electron microscope manufactured by FEI Company Japan Ltd. and an energy dispersive X-ray analyzer provided with that device.

More specifically, particles containing 50% by weight to 95% by weight of zirconia and 5.0% by weight to 50% by weight of ceria and rare earth oxide other than ceria were located by energy dispersive X-ray analysis from among particles having an equivalent diameter of 0.10 µm or more on a screen projected at a measurement magnification factor of 20,000× by this device. These were recognized as first carrier particles. The equivalent diameter of these particles was then calculated from the projected area of the particles. This process was then carried out on 20 arbitrary screens, and the mean value of all particles was taken to be the mean particle diameter of the first carrier particles.

Moreover, particles containing 1.0% by weight to 40% by weight of zirconia and 60% by weight to 99% by weight of ceria and rare earth oxide other than ceria were located from among particles having an equivalent diameter of 10 µm or more, and these particles were recognized as second carrier particles. The equivalent diameter of these particles was then calculated from the projected area of the particles. This process was then carried out on 20 arbitrary screens, and the mean value of all particles was taken to be the mean particle diameter of the second carrier particles.

Moreover, the projected area ratio of the projected area of the second carrier particles to the projected area of the first and second carrier particles (projected area of second carrier particles/projected area of first and second carrier particles) was calculated for each of the exhaust gas purifying catalysts and used as the abundance ratio of the second carrier particles.

<Correlation Coefficient of Catalyst Location>

Element mapping images were generated for rare earth and precious metal elements by carrying out energy dispersive X-ray analysis using the Tecnai Osiras scanning transmission electron microscope manufactured by FEI Company Japan Ltd. The locations of rare earth elements and precious metal elements in the carrier particles were compared, the elements were defined as being supported on the second carrier and in the case the locations coincided at a correlation coefficient of 65% or more, and were defined as not being supported on the carrier in the case the locations coincided at a correlation coefficient of less than 65%.

<Changes in Particle Diameter of Catalyst Particles>

The exhaust gas purifying catalysts after durability testing as described above were analyzed with an X-ray diffractometer to analyze the particle diameter of precious metal catalyst particles. Particle diameter was calculated from Scherrer's equation using diffraction peak half width values of $2\theta=41.1°$ for rhodium, $2\theta=40.1°$ for palladium and $2\theta=39.8°$ for platinum. On the basis of these results, the percentage change in precious metal particle diameter resulting from the addition of carboxylic acid was calculated for Examples 1 to 4 and 7 to 19 and Comparative Examples 1 to 2 and 6 to 9 based on Comparative Example 3 in which carboxylic acid was not added. The percentage change in precious metal particle diameter was calculated for Examples 5 and 6 based on Comparative Examples 4 and 5, respectively. In Table 1, a "−" symbol indicates a decrease in particle diameter, while a "+" symbol indicates an increase in particle diameter.

<50% $NO_X$ Purification Temperature>

The exhaust gas purification devices after durability testing were arranged in a normal pressure, fixed bed, continuous flow reactor followed by raising the temperature from 100° C. to 500° C. at the rate of 12° C./min while allowing a stoichiometrically equivalent model gas to flow there through and continuously measuring $NO_X$ purification rate during that time. The temperature at which 50% of the exhaust gas was purified was investigated for each sample.

<STEM-EDX Imaging>

Images of element mapping were captured for Example 3 and Comparative Example 3 by energy dispersive X-ray analysis using a scanning transmission electron microscope.

<<Results>>

Figure 2:
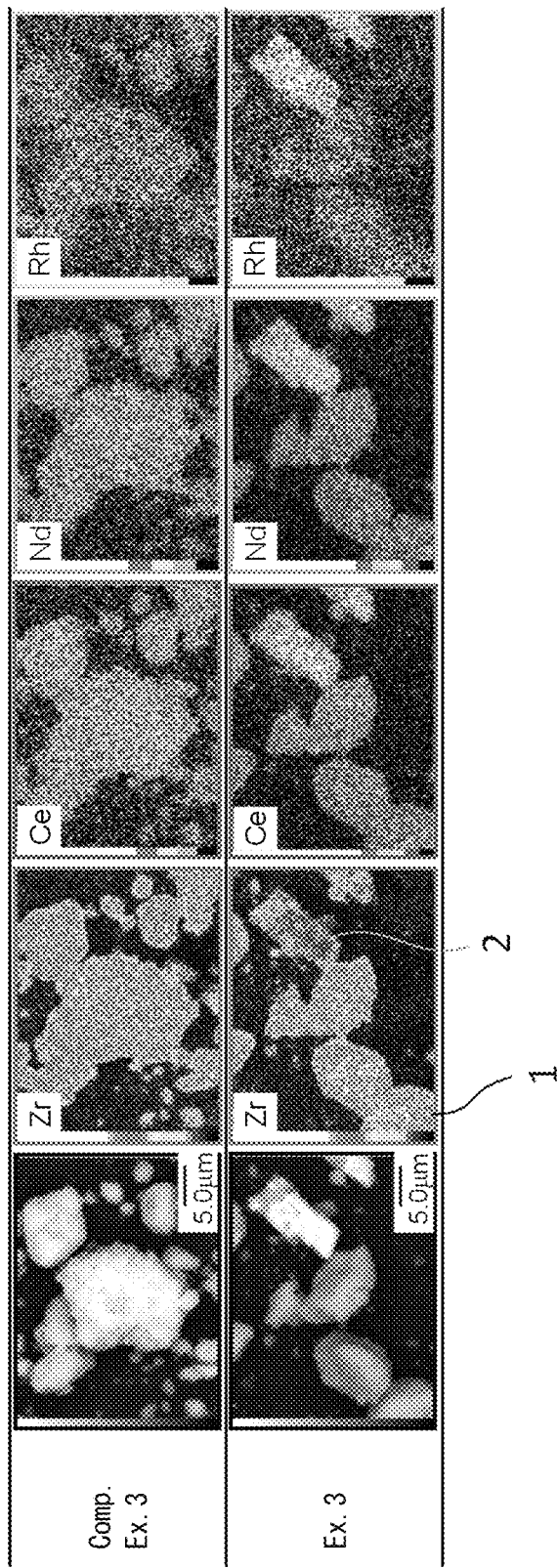
FIG. 2 shows the element mapping by energy dispersive X-ray analysis using a scanning transmission electron microscope carried out on exhaust gas purifying catalysts of Example 3 and Comparative Example 3.

The results of the aforementioned evaluations are shown in Tables 1 to 4. In addition, STEM-EDX images of Example 3 and Comparative Example 3 are shown in FIG. 2.

TABLE 1

| | | Examples | | | | Comparative Examples | | |
|---|---|---|---|---|---|---|---|---|
| | | 1 | 2 | 3 | 4 | 1 | 2 | 3 |
| Composition of carrier particles used in production (wt %) | $ZrO_2$ | 70 | 70 | 70 | 70 | 70 | 70 | 70 |
| | $CeO_2$ | 20 | 20 | 20 | 20 | 20 | 20 | 20 |
| | $La_2O_3$ | 3 | 3 | 3 | 3 | 3 | 3 | 3 |
| | $Nd_2O_3$ | 7 | 7 | 7 | 7 | 7 | 7 | 7 |
| | $Y_2O_3$ | 0 | 0 | 0 | 0 | 0 | 0 | 0 |
| | $Pr_6O_{10}$ | 0 | 0 | 0 | 0 | 0 | 0 | 0 |
| Precious metal catalyst | Type | Rh | Rh | Rh | Rh | Rh | Rh | Rh |
| Acid | Type | Acetic acid | Propionic acid | Oxalic Acid | Tartaric Acid | Benzene sulfonic acid | Nitric Acid | — |
| | Amount [mol/mol-Ln] | 3 | 3 | 1.5 | 1.5 | 1.5 | 3 | 0 |
| | Reaction equivalence point magnification factor | 1.00 | 1.00 | 1.00 | 1.00 | 1.00 | 1.00 | 0 |
| First carrier mean particle diameter | [μm] | 30 | 30 | 30 | 30 | 30 | 30 | 30 |
| Second carrier mean particle diameter | [μm] | 1.8 | 1.8 | 1.9 | 1.9 | 0.2 | 0.2 | 0 |
| Second carrier abundance ratio | [%] | 7.0 | 7.0 | 6.4 | 6.7 | 12.9 | 3.2 | 0.0 |
| Catalyst location correlation coefficient | [%] | 70 | 70 | 85 | 80 | 12.5 | 15 | 22.5 |
| Change in catalyst particle diameter | [%] | −6.1 | −6.1 | −15.9 | −11.4 | 24.7 | 24.0 | Reference |
| 50% $NO_x$ purification temperature | [° C.] | 273 | 271 | 262 | 263 | 301 | 295 | 284 |

TABLE 2

|  |  | Examples | | Comparative Examples | |
|---|---|---|---|---|---|
|  |  | 5 | 6 | 4 | 5 |
| Composition of carrier particles used in production (wt %) | $ZrO_2$ | 60 | 60 | 60 | 60 |
|  | $CeO_2$ | 30 | 30 | 30 | 30 |
|  | $La_2O_3$ | 5 | 5 | 5 | 5 |
|  | $Nd_2O_3$ | 5 | 5 | 5 | 5 |
|  | $Y_2O_3$ | 0 | 0 | 0 | 0 |
|  | $Pr_6O_{10}$ | 0 | 0 | 0 | 0 |
| Precious metal catalyst | Type | Pd | Pt | Pd | Pt |
| Acid | Type | Propionic acid | Propionic acid | — | — |
|  | Amount [mol/mol-Ln] | 3 | 3 | 0 | 0 |
|  | Reaction equivalence point magnification factor | 1.00 | 1.00 | 0.00 | 0.00 |
| First carrier mean particle diameter | [μm] | 25 | 25 | 25 | 25 |
| Second carrier mean particle diameter | [μm] | 1.9 | 1.5 | 0 | 0 |
| Second carrier abundance ratio | [%] | 7.3 | 5.4 | 0.0 | 0.0 |
| Catalyst location correlation coefficient | [%] | 72.5 | 67.5 | 30 | 25 |
| Change in catalyst particle diameter | [%] | −8.1 | −5.1 | Reference | Reference |
| 50% NOx purification temperature | [° C.] | 300 | 342 | 316 | 359 |

TABLE 3

|  |  | Examples | | | | | | | | |
|---|---|---|---|---|---|---|---|---|---|---|
|  |  | 7 | 8 | 9 | 10 | 11 | 12 | 13 | 14 | 15 |
| Composition of carrier particles used in production (wt %) | $ZrO_2$ | 65 | 65 | 65 | 65 | 65 | 65 | 65 | 65 | 65 |
|  | $CeO_2$ | 25 | 25 | 25 | 25 | 25 | 25 | 25 | 25 | 25 |
|  | $La_2O_3$ | 4 | 4 | 4 | 4 | 4 | 4 | 4 | 4 | 4 |
|  | $Nd_2O_3$ | 6 | 6 | 6 | 6 | 6 | 6 | 6 | 6 | 6 |
|  | $Y_2O_3$ | 0 | 0 | 0 | 0 | 0 | 0 | 0 | 0 | 0 |
|  | $Pr_6O_{10}$ | 0 | 0 | 0 | 0 | 0 | 0 | 0 | 0 | 0 |
| Precious metal catalyst | Type | Rh | | | | | | | | |
| Acid | Type | Tartaric acid | | | | | | | | |
|  | Amount [mol/mol-Ln] | 0.5 | 1 | 1 | 2 | 3 | 4 | 5 | 6 | 12 |
|  | Reaction equivalence point magnification factor | 0.50 | 0.67 | 1.00 | 1.33 | 2.00 | 2.67 | 3.33 | 4.00 | 8.00 |
| First carrier mean particle diameter | [μm] | 30 | 30 | 30 | 30 | 30 | 30 | 30 | 30 | 30 |
| Second carrier mean particle diameter | [μm] | 0.6 | 1.7 | 2 | 2.3 | 3.7 | 4.3 | 4.9 | 6.9 | 10 |
| Second carrier abundance ratio | [%] | 1.3 | 5.0 | 6.4 | 8.1 | 8.8 | 9.1 | 9.8 | 12.1 | 12.6 |
| Catalyst location correlation coefficient | [%] | 65 | 72.5 | 75 | 85 | 87.5 | 82.5 | 70 | 65 | 65 |
| Change in catalyst particle diameter | [%] | −3.2 | −6.8 | −11.2 | −15.4 | −22.6 | −13.8 | −5.8 | −0.1 | 0 |
| 50% $NO_x$ purification temperature | [° C.] | 274 | 269 | 268 | 264 | 261 | 265 | 270 | 283 | 286 |

TABLE 4

|  |  | Examples | | | | Comparative Examples | | | |
| --- | --- | --- | --- | --- | --- | --- | --- | --- | --- |
|  |  | 16 | 17 | 18 | 19 | 6 | 7 | 8 | 9 |
| Composition of carrier particles used in production (wt %) | $ZrO_2$ | 57 | 57 | 57 | 60 | 60 | 100 | 0 | 60 |
|  | $CeO_2$ | 29 | 29 | 24 | 0 | 40 | 0 | 100 | 0 |
|  | $Al_2O_3$ | 0 | 0 | 0 | 30 | 0 | 0 | 0 | 30 |
|  | $La_2O_3$ | 6 | 15 | 6 | 4 | 0 | 0 | 0 | 4 |
|  | $Nd_2O_3$ | 3 | 0 | 3 | 2 | 0 | 0 | 0 | 2 |
|  | $Y_2O_3$ | 6 | 0 | 6 | 4 | 0 | 0 | 0 | 4 |
|  | $Pr_6O_{10}$ | 0 | 0 | 5 | 0 | 0 | 0 | 0 | 0 |
| Precious metal catalyst | Type | Rh | Rh | Rh | Rh | Rh | Rh | Rh | Rh |
| Acid | Type | Acetic acid | Acetic acid | Acetic acid | Oxalic acid | Acetic acid | Acetic acid | Acetic acid | — |
|  | Amount [mol] | 3 | 3 | 3 | 1.5 | 3 | 3 | 3 | 0 |
|  | Reaction equivalence point magnification factor | 1.00 | 1.00 | 1.00 | 1 | — | — | — | — |
| First carrier mean particle diameter | [μm] | 25 | 25 | 25 | 25 | 25 | 25 | 25 | 25 |
| Second carrier mean particle diameter | [%] | 2.4 | 2.1 | 2.2 | 2.5 | — | — | — | — |
| Second carrier abundance ratio | [%] | 6.2 | 9.2 | 5.7 | 6.5 | — | — | — | — |
| Catalyst location correlation coefficient | [%] | 75 | 72.5 | 77.5 | 75 | — | — | — | 15 |
| Change in catalyst particle diameter | [%] | −8 | −6.9 | −9.3 | −13.5 | 3.2 | 27.3 | 32.7 | Reference |
| 50% $NO_x$ purification temperature | [° C.] | 263 | 267 | 264 | 257 | 297 | 304 | 313 | 280 |

As can be understood from Table 1, second carrier particles having a suitable mean particle diameter were easily obtained in the case of using an organic carboxylic acid (Examples 1 to 4). In looking at Comparative Examples 1 and 2, although the second carrier particles per se were determined to have been formed, the particle diameter thereof was extremely small, and in this case, as can be judged from the correlation coefficient, catalyst particles were not substantially supported on the second carrier particles. This is thought to be due to the precious metal catalyst particles also being supported on the first carrier particles due to the small size of the second carrier particles, thereby causing the precious metal catalyst particles to undergo sintering.

In addition, the diameter of the precious metal catalyst particles can be seen to have decreased after durability testing in the case of using an organic carboxylic acid (Examples 1 to 4). In the case of using benzenesulfonic acid or nitric acid instead of an organic carboxylic acid (Comparative Examples 1 and 2), the size of the precious metal catalyst particles increased in comparison with the case of not using acid (Comparative Example 3). Moreover, the 50% $NO_X$ purification temperature was extremely low in the case of Examples 1 to 4.

As can be understood from Tables 2 and 4, these trends were similarly observed even in the case of changing the composition of the starting carrier particles and type of precious metal.

In looking at Table 3, the particle diameter of the second carrier particles can be understood to increase when the added amount of organic carboxylic acid was increased. However, the diameter of the precious metal catalyst particles can be seen to decrease when the amount of organic carboxylic acid was increased. The 50% $NO_X$ purification temperature also changed in correspondence therewith.

In looking at the results of element mapping of the exhaust gas purification catalyst of Comparative Example 3 shown in FIG. 2, the distribution of the abundance ratios of each element can be understood to be uniform. In contrast, in looking at the results of element mapping of Example 3, the abundance ratios of cerium (Ce) and neodymium (Ne) can be seen to be extremely high at those locations where the abundance ratio of zirconium (Zr) is low, and these locations can be understood to be the locations of the second carrier particles. In addition, the abundance ratio of rhodium (Rh) can be seen to be high at the locations of the second carrier particles, thereby demonstrating that the precious metal catalyst particles are intensively supported on the second carrier particles.

REFERENCE SIGNS LIST

1 First carrier particle
1a Rare earth element-enriched area
2 Second carrier particle
3 Catalyst particle
10 Exhaust gas purifying catalyst

The invention claimed is:
1. An exhaust gas purifying catalyst having a first carrier particle, a second carrier particle, and a precious metal catalyst particle supported on the first carrier particle and the second carrier particle; wherein, the first carrier particle contains at least one metal oxide selected from the group consisting of silica, alumina, ceria, zirconia and titania, and a rare earth oxide other than ceria, the second carrier particle contains a rare earth oxide other than ceria, and optionally contains at least one metal oxide selected from the group consisting of silica, alumina, ceria, zirconia and titania, the content of the metal oxide of the first carrier particle is higher than the content of the metal oxide of the second carrier particle, the content of the rare earth oxide other than ceria of the first carrier particle is less than 20% by weight, and the content of the rare earth oxide other than ceria of the second carrier particle is 20% by weight or more, and wherein when measurement of the intensity of characteristic X-rays, obtained by energy dispersive X-ray analysis using a scanning electron microscope, is carried out, the correlation coefficient calculated according to the formula below is 65.0% or more:

$$\frac{\sum_{i=1}^{n}(x_i - x_{av})(y_i - y_{av})}{\sqrt{\sum_{i=1}^{n}(x_i - x_{av})^2}\sqrt{\sum_{i=1}^{n}(y_i - y_{av})^2}} \times 100(\%) \quad [\text{Math. 1}]$$

wherein the spectral intensity value of a precious metal element contained in a precious metal catalyst particle i is defined as $x_i$, the average spectral intensity of the precious metal element is defined as $x_{av}$, the spectral intensity value of the rare earth element other than cerium at the location of the precious metal catalyst particle i is defined as $y_i$, and the average spectral intensity of the rare earth element other than cerium is defined as $y_{av}$.

2. The exhaust gas purifying catalyst according to claim 1, wherein, in the case of observing the first carrier particle and the second carrier particle with a scanning transmission electron microscope, the ratio of the projected area of the second carrier particle to the projected area of the first carrier particle (area of second carrier particle/area of first carrier particle) is within the range of 0.050 to 0.100.

3. The exhaust gas purifying catalyst according to claim 1, wherein the metal oxide of the first carrier particle and the metal oxide of the second carrier particle if present are ceria-zirconia solid solutions, and the rare earth oxide other than ceria of the first carrier particle and the rare earth oxide other than ceria of the second carrier particle are oxides of at least one rare earth element selected from the group consisting of yttrium, lanthanum, praseodymium, neodymium and samarium.

4. The exhaust gas purifying catalyst according to claim 3, wherein the first carrier particle contains 50% by weight to 95% by weight of zirconia, 5.0% by weight to 45% by weight of ceria and 1.0% by weight to less than 20% by weight of a rare earth oxide other than ceria, and the second carrier particle contains 1.0% by weight to 40% by weight of zirconia, 60.0% by weight to 99% by weight of ceria, and a rare earth oxide other than ceria.

5. The exhaust gas purifying catalyst according to claim 1, wherein the mean particle diameters of the first carrier particle and the second carrier particle as measured with a scanning transmission electron microscope are 0.50 μm to 100 μm and 0.50 μm to 5 μm, respectively.

6. The exhaust gas purifying catalyst according to claim 1, wherein the precious metal catalyst particle contains platinum particles, palladium particles, rhodium particles or a combination thereof.

7. An exhaust gas purification device containing the exhaust gas purifying catalyst according to claim 1 and a substrate.

8. A method for producing the exhaust gas purifying catalyst according to claim 1, comprising:

a step for mixing an aqueous dispersion of a carrier particle, containing at least one metal oxide selected from the group consisting of silica, alumina, ceria, zirconia and titania and a rare earth oxide other than cerium, an aqueous solution containing a salt of a catalyst precious metal, and an organic carboxylic acid, and supporting the catalyst precious metal on the carrier particle to obtain an aqueous dispersion containing an unfired exhaust gas purifying catalyst; and, a step for drying and firing the aqueous dispersion containing the unfired exhaust gas purifying catalyst.

9. The method according to claim 8, wherein the metal oxide of the carrier particle is a ceria-zirconia solid solution, the rare earth oxide of the carrier particle is an oxide of at least one rare earth element selected from the group consisting of yttrium, lanthanum, praseodymium, neodymium and samarium, and the salt of the catalyst precious metal is a nitrate or sulfate of platinum, palladium, rhodium or a combination thereof.

10. The method according to claim 8, wherein the organic carboxylic acid is an organic carboxylic acid having a molecular weight of 300 or less.

11. The method according to claim 8, wherein the molar ratio of the number of moles of the organic carboxylic acid to the total number of moles of rare earth element contained in the carrier particle (mol/mol-Ln) is 0.5 to 3.5.

* * * * *